W. G. MORRIS.
AUTOMATICALLY CONTROLLED AUXILIARY AIR INLET DEVICE FOR INTERNAL COMBUSTION ENGINES.
APPLICATION FILED JUNE 1, 1915.
1,160,640.
Patented Nov. 16, 1915.
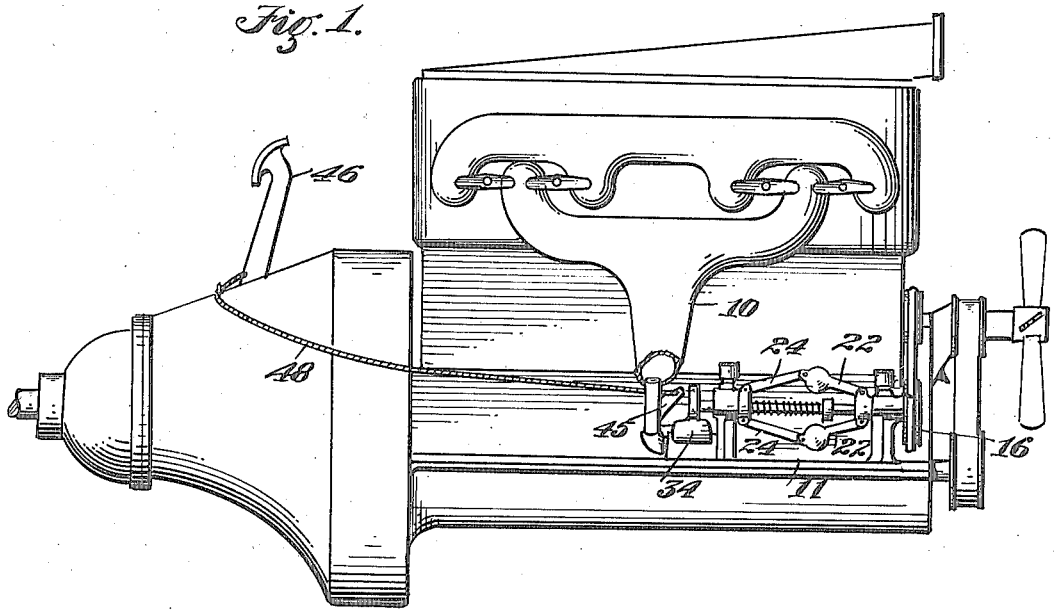
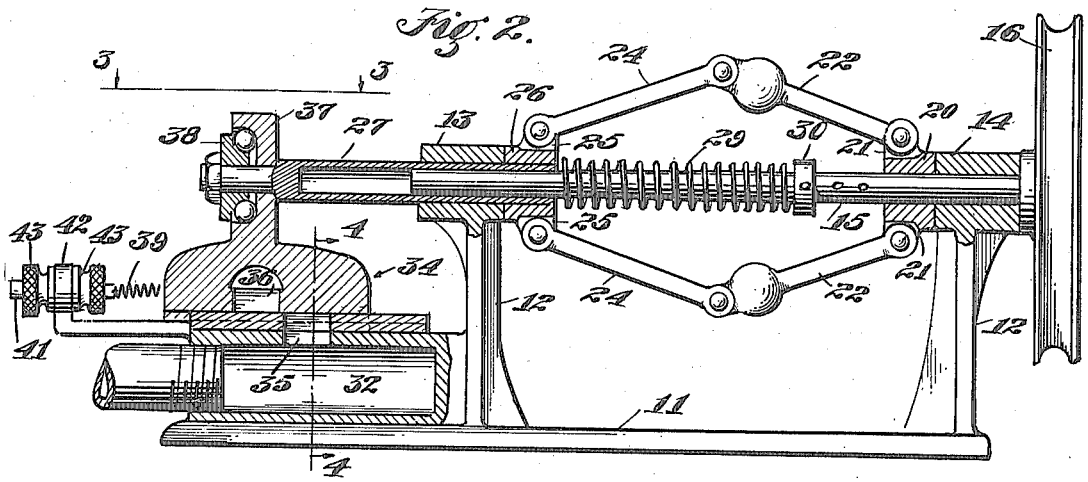
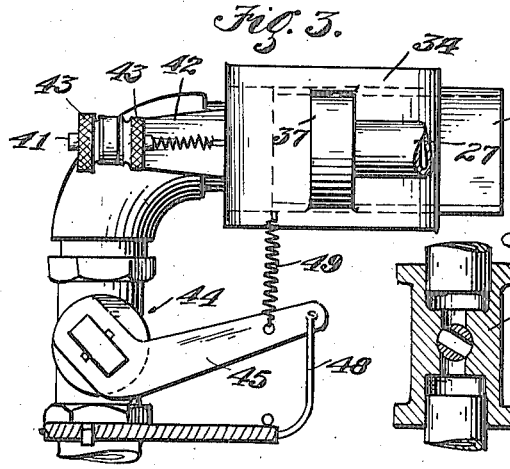
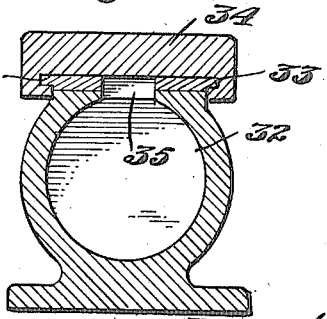
Inventor,
William G. Morris.
Hazard Berry and Miller
Attys.

UNITED STATES PATENT OFFICE.

WILLIAM G. MORRIS, OF LOS ANGELES, CALIFORNIA.

AUTOMATICALLY-CONTROLLED AUXILIARY-AIR-INLET DEVICE FOR INTERNAL-COMBUSTION ENGINES.

1,160,640.  Specification of Letters Patent.  Patented Nov. 16, 1915.

Application filed June 1, 1915. Serial No. 31,573.

*To all whom it may concern:*

Be it known that I, WILLIAM G. MORRIS, a citizen of the United States, residing at Los Angeles, in the county of Los Angeles and State of California, have invented new and useful Improvements in Automatically-Controlled Auxiliary-Air-Inlet Devices for Internal-Combustion Engines, of which the following is a specification.

My invention relates to an automatically controlled auxiliary air inlet device for internal combustion engines, especially designed for use in automobile construction in which auxiliary air is introduced into the manifold of the engine.

It is an object of my invention to increase the supply of air as the speed of the engine increases and to provide means connected to the clutch controlling the transmission gear whereby the auxiliary air is cut off when the clutch is in neutral position.

Another object of this invention is to construct an auxiliary air inlet device in which an engine operated governor controls the air inlet port supplying air to the manifold.

Another object of this invention is to provide manually operated means whereby the action of the governor can easily be adjusted and the air supply accurately controlled.

In the accompanying drawings in which I have illustrated a convenient and practical construction of the device, and which form a part of this specification: Figure 1 is a side view of the internal combustion engine of an automobile to which the auxiliary air inlet device is attached. Fig. 2 is a side elevation of the device with the part leading to the manifold broken away. Fig. 3 is a top plan view of the forward end of the device taken on line 3—3 of Fig. 2. Fig. 4 is a detail view on an enlarged scale taken on line 4—4 of Fig. 2. Fig. 5 is a detail view of the valve operated by the clutch.

10 represents the manifold of an internal combustion engine of an automobile to which the auxiliary air is supplied. On a base plate 11 conveniently secured to the face of the engine at any suitable place are two upright standards 12 provided with bearings 13 and 14. A shaft 15 is journaled in bearing 14. On the forward end of the shaft a pulley 16 is secured which is rotated by means of a belt or band operated from a pulley fast on the fan shaft of the engine. Adjacent to bearing 14 a collar 20 is secured to shaft 15.

A pair of slotted ears 21 extend from opposite sides of this collar. A pair of arms 22 provided near their outer ends with a weight are pivoted to the slotted ears 21, and arms 24 pivoted at one end to arms 21 are pivoted at the other end to slotted ears 25 extending from opposite sides of a collar 26 which is fast on the end of a hollow shaft 27. The latter is journaled in bearing 13 and solid shaft 15 extends longitudinally therein for a short distance, allowing hollow shaft 27 to move longitudinally thereon for a distance corresponding to the movement of slide valve 34, presently to be referred to. A helical spring 29 encircles shaft 15 and abuts against collar 30 at one end and against collar 26 at the other, and tends to press collar 26 against journal 13. A conduit 32 secured to the base plate and communicating with the manifold 10 is provided at its upper face with a pair of longitudinal guide flanges 33 on which the slide valve 34 is movably mounted. Conduit 32 has a port 35 with which the port 36 of the sliding valve 34 is adapted to register, thereby establishing communication between the atmosphere and the manifold. Extending upwardly from the slide valve 34 is a lug 37 provided with an aperture through which shaft 27 is rotatably mounted. An end bearing 38 reduces the friction between lug 37 and shaft 27. An expansible coiled spring 39 connects the forward end of the slide valve 34 to a screw 41 journaled in a bracket 42 extending from the conduit. A pair of thumb nuts 43 positioned at opposite sides of bracket 42 engaging said screw adjust the tension of spring 39. Adjacent to the inlet of the manifold, conduit 32 is provided with a cut off valve 44. An arm 45 extending therefrom is connected to a clutch pedal 46 operating the transmission gear by means of a wire 48 mounted in a flexible wire tubing. Spring 49 connecting the arm 45 to the base plate tends to keep the valve in a closed position.

Operation: Pulley 16 will be rotated from the fan shaft and as the speed of the engine increases hollow shaft 27 will be caused to move inwardly sliding on the central shaft 15 against the tension of the spring 29. Sliding valve 34 will be moved in the same direction causing port 36 to register with port 35 on the conduit in proportion to the amount of movement of shaft 27. The suction of the engine will cause air to pass through port 35 and conduit 32 into the manifold, diluting the gaseous mixtures flowing from the carbureter to the internal combustion engine. Such dilution of the mixture will cause an increase of power and a corresponding saving of gasolene. As is well known, the gaseous mixture coming from the carbureter is usually too rich when the engine is speeded up, causing not only a loss of power and a waste of gasolene but also carbon deposits in the cylinders. This is prevented by my device. When it is desired to adjust the action of the governor, thumb nuts 43 are operated to increase or decrease the tension of spring 39. Since this spring acts in opposition to spring 29 it is obvious that it is equivalent to adjusting the tension of spring 29 itself.

The cut off valve 44 is operated by the clutch pedal 46 which controls the transmission gear. The valve is normally open when the automobile is running but is closed when the clutch is in its neutral position. When in this position the engine will race and it is therefore not desirable to increase the velocity of the engine by supplying auxiliary air to the manifold, and therefore the cut off valve is closed.

The neutral position of the clutch pedal operating the transmission gear is when the gear is shifted, during the running of the car, from high to low or vice versa, and is that position of the clutch when neither gear is engaged and the engine would tend to race.

I claim:

1. In an auxiliary air inlet device for an internal combustion engine power plant, a manifold, a conduit provided with an air port communicating therewith, a slide valve normally covering said port, an engine operated governor actuating said slide valve and progressively uncovering said port as the speed of the engine increases, a manually adjustable spring secured to said valve and acting in opposition to the governor operating said valve, a cut-off valve in said conduit, a transmission device including a clutch and a clutch pedal, and means connecting said clutch pedal and a cut-off valve adapted to close the cut-off valve when the clutch is in neutral position.

2. In an auxiliary air inlet device for an internal combustion engine power plant, a manifold, a conduit having an air port communicating therewith, a valve normally closing said port, an engine operated governor actuating said valve and progressively uncovering said port as the speed of the engine increases, a manually adjustable spring acting in opposition to said governor, a cut-off valve in said conduit, a transmission device including a clutch and a clutch pedal, and means connecting said clutch pedal and a cut-off valve adapted to close the cut-off valve when the clutch is in neutral position.

3. In an auxiliary air inlet device for an internal combustion engine power plant, a manifold, a conduit having an air port communicating therewith, a valve controlling said port, an engine operated governor actuating said valve, a manually adjustable spring acting in opposition to said governor, a cut-off valve in said conduit, a transmission device including a clutch and a clutch pedal, and means connecting said clutch pedal and a cut-off valve adapted to close the cut-off valve when the clutch is in neutral position.

4. In an auxiliary air inlet device for an internal combustion engine power plant, a manifold, a conduit having an air port communicating therewith, a valve controlling said port, an engine operated governor actuating said valve, a cut-off valve in said conduit, a transmission device including a clutch and a clutch pedal, and means connecting said clutch pedal and a cut-off valve adapted to close the cut-off valve when the clutch is in neutral position.

In testimony whereof I have signed my name to this specification.

WILLIAM G. MORRIS.